US012393300B1

(12) United States Patent
Jeon

(10) Patent No.: US 12,393,300 B1
(45) Date of Patent: Aug. 19, 2025

(54) TOUCH SENSING DISPLAY APPARATUS

(71) Applicant: LG Display Co., Ltd., Seoul (KR)

(72) Inventor: Je Seong Jeon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/910,692

(22) Filed: Oct. 9, 2024

(30) Foreign Application Priority Data

Feb. 16, 2024 (KR) ........................ 10-2024-0022549

(51) Int. Cl.
*G06F 3/041* (2006.01)
*G06F 3/044* (2006.01)

(52) U.S. Cl.
CPC ...... *G06F 3/04164* (2019.05); *G06F 3/04166* (2019.05); *G06F 3/04186* (2019.05); *G06F 3/044* (2013.01); *G06F 2203/04104* (2013.01)

(58) Field of Classification Search
CPC ............ G06F 3/04164; G06F 3/04166; G06F 3/04186; G06F 3/044; G06F 2203/04104
See application file for complete search history.

(56) References Cited

U.S. PATENT DOCUMENTS

| 10,671,229 | B2 | 6/2020 | Ahn | |
|---|---|---|---|---|
| 11,397,489 | B2 * | 7/2022 | Huang | ................. G06F 3/0448 |
| 2019/0278400 | A1 * | 9/2019 | Ahn | ...................... G06F 3/0412 |
| 2021/0064212 | A1 * | 3/2021 | Huang | ................ G06F 3/04164 |

FOREIGN PATENT DOCUMENTS

| KR | 10-2015-0031767 A | 3/2015 |
|---|---|---|
| KR | 10-2016-0095594 A | 8/2016 |
| KR | 10-2019-0029045 A | 3/2019 |
| KR | 10-2022-0015689 A | 2/2022 |

* cited by examiner

*Primary Examiner* — Michael Pervan
(74) *Attorney, Agent, or Firm* — Fenwick & West LLP

(57) ABSTRACT

A touch sensing display apparatus includes a first touch block including a plurality of first RX electrodes and a first TX electrode pattern dividing the plurality of first RX electrodes, a second touch block including a plurality of second RX electrodes and a second TX electrode pattern dividing the plurality of second RX electrodes, a TX driving circuit connected to the first TX electrode pattern through a first TX driving line and connected to the second TX electrode pattern through a second TX driving line, and an RX sensing circuit connected to the first RX electrodes and the second RX electrodes through a plurality of RX sensing lines, wherein each of the plurality of RX sensing lines is connected to one of the plurality of first RX electrodes and one of the plurality of second RX electrodes in common.

10 Claims, 7 Drawing Sheets

TOUCH SENSING DISPLAY APPARATUS

CROSS-REFERENCE TO RELATED APPLICATION

This application claims the benefit of the Republic of Korea Patent Application No. 10-2024-0022549 filed on Feb. 16, 2024, which is hereby incorporated by reference in its entirety.

BACKGROUND

Field of Technology

The present disclosure relates to a touch sensing display apparatus.

Discussion of the Related Art

Touch sensing display apparatuses include a display panel including a touch sensor. Because the number of touch electrodes and touch lines increases as display panels enlarge in size, there is a problem where a production yield of display panels is low or the manufacturing cost increases.

Moreover, in a multi-touch input where a display panel is simultaneously touched by two or more fingers or a finger and a stylus pen, a problem may occur where an untouched point is abnormally recognized as a touch position due to a ghost phenomenon.

SUMMARY

To overcome the aforementioned problem of the related art, the present disclosure may provide a touch sensing display apparatus in which touch electrodes are connected to a touch sensing circuit in a multi-connection type to decrease the number of touch channels.

Moreover, the present disclosure may provide a touch sensing display apparatus which may sequentially sense touch electrodes connected to one another in a multi-connection type to prevent or at least reduce the occurrence of a ghost touch.

To achieve these objects and other advantages and in accordance with the purpose of the disclosure, as embodied and broadly described herein, a touch sensing display apparatus includes a first touch block including a plurality of first RX electrodes and a first TX electrode pattern dividing the plurality of first RX electrodes, a second touch block including a plurality of second RX electrodes and a second TX electrode pattern dividing the plurality of second RX electrodes, a TX driving circuit connected to the first TX electrode pattern through a first TX driving line and connected to the second TX electrode pattern through a second TX driving line, and an RX sensing circuit connected to the first RX electrodes and the second RX electrodes through a plurality of RX sensing lines, wherein each of the plurality of RX sensing lines is connected to one of the plurality of first RX electrodes and one of the plurality of second RX electrodes in common.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
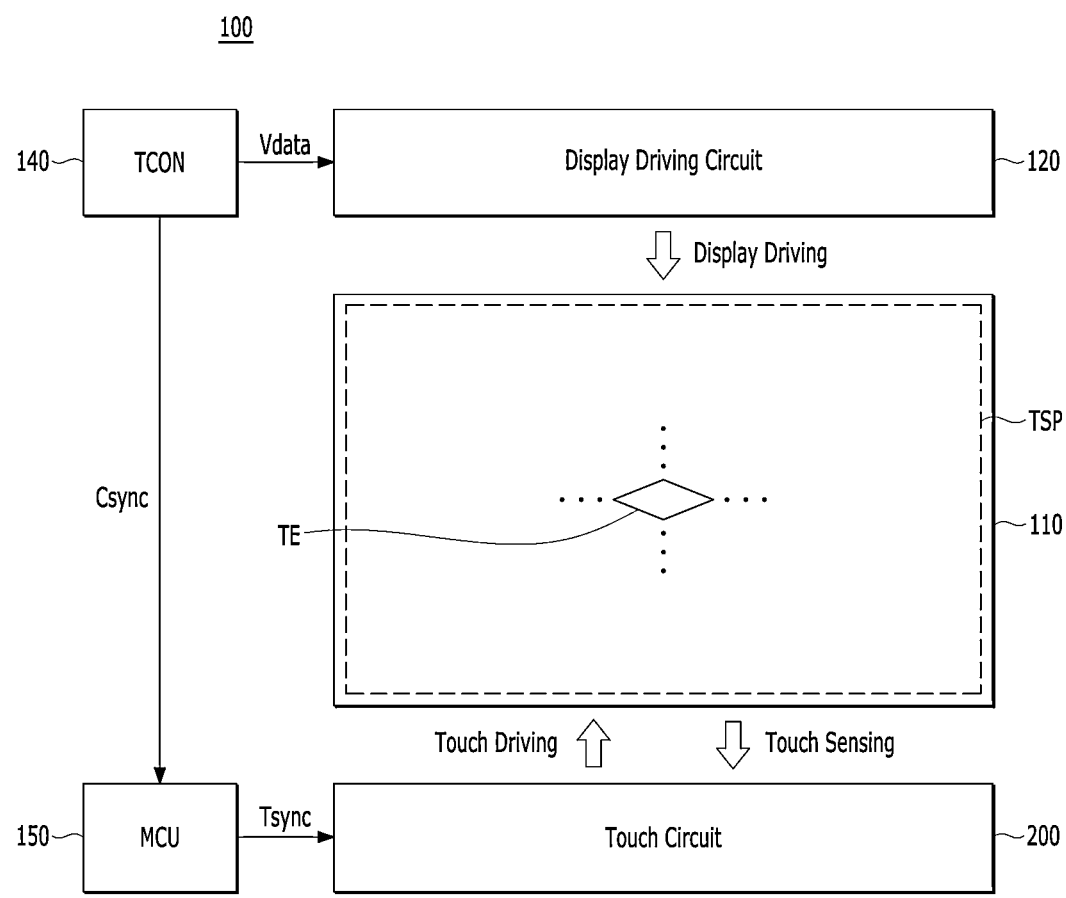
FIG. 1 is a diagram schematically illustrating a touch sensing display apparatus according to one embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a diagram schematically illustrating a touch sensing display apparatus 100 according to the present disclosure.

Referring to FIG. 1, the touch sensing display apparatus 100 according to the present embodiments may provide a display function of reproducing an input image on a screen thereof and a touch sensing function of sensing a touch input of a user.

The touch sensing display apparatus 100 may include a display panel 110 where data lines and gate lines are provided and a display driving circuit 120 for driving the display panel 110.

In terms of functions, the display driving circuit 120 may include a data driving circuit for driving the data lines, a gate driving circuit for driving the gate lines, and a controller for controlling the data driving circuit and the gate driving circuit. The display driving circuit 120 may be implemented as one or more integrated circuits (ICs).

The touch sensing display apparatus 100 may include a touch screen panel TSP where a plurality of touch electrodes TE are disposed for touch sensing and a touch circuit 200 which performs driving and sensing processing of the touch screen panel TSP.

The touch screen panel TSP may be an external type where the touch screen panel TSP is manufactured independently from the display panel 110 and is bonded to the display panel 110, or may be an internal type where the touch screen panel TSP is manufactured together in a manufacturing process of the display panel 110 and is provided in the display panel 110. In the touch sensing display apparatus 100 according to the present disclosure, the touch screen panel TSP may be an independent panel including the touch sensing function, or may denote the display panel 110 which has all of the touch sensing function and the display function. Hereinafter, the internal type where the touch screen panel TSP is in the display panel 110 will be described for example.

The touch circuit 200 may supply a touch driving signal to the display panel 110, may receive a touch sensing signal from the display panel 110, and may detect touch coordinates and whether there is a touch, based on the touch sensing signal. The touch circuit 200 may be implemented as one element or two or more elements (for example, integrated circuit (IC)) and may be implemented independently from the display driving circuit 120. Also, all or a portion of the touch circuit 200 may be integrated and implemented in the display driving circuit 120 or an internal circuit thereof. For example, a portion of the touch circuit 200 may be implemented as an IC along with the data driving circuit of the display driving circuit 120.

The touch sensing display apparatus 100 may include a micro control unit (MCU) 150 which controls the touch circuit 200. The micro control unit 150 (e.g., a circuit) may be supplied with a control synchronization signal Csync from a timing controller (TCON) 140 and may generate a touch synchronization signal Tsync for controlling the touch circuit 200, based on the control synchronization signal Csync.

The micro control unit 150 may transfer or receive the touch synchronization signal Tsync, based on an interface defined between the touch circuit 200 and the micro control unit 150. The micro control unit 150 may be formed as one IC type along with a touch controller of the touch circuit 200, or may be implemented as one IC type along with the timing controller 140.

The touch sensing display apparatus 100 may include the timing controller (TCON) 140 which controls the display driving circuit 120 and the micro control unit 150. The timing controller 140 may be supplied with a data signal Vdata of an input video and a timing signal such as a vertical synchronization signal, a horizontal synchronization signal, a data enable signal, and a dot clock from a host system (not shown).

The timing controller 140 may control a gate driving timing of the display driving circuit 120, based on a scan timing control signal such as a gate start pulse, a gate shift clock, and a gate output enable signal. Also, the timing controller 140 may control a data driving timing of the display driving circuit 120, based on a data timing control signal such as a source sampling clock and a source output enable signal.

The touch sensing display apparatus 100 may sense touch coordinates and whether there is a touch, based on a capacitance difference occurring in the touch electrodes TE.

The touch sensing display apparatus 100 may be apparatuses of various types such as a liquid crystal display (LCD) apparatus, an organic light emitting display apparatus, a plasma display panel, and a quantum dot display apparatus.

For example, when the touch sensing display apparatus 100 according to embodiments of the present disclosure is an LCD apparatus, the plurality of touch electrodes TE may be disposed in the display panel 110 and may be common electrodes to which a common voltage for display driving is applied.

Figure 2:
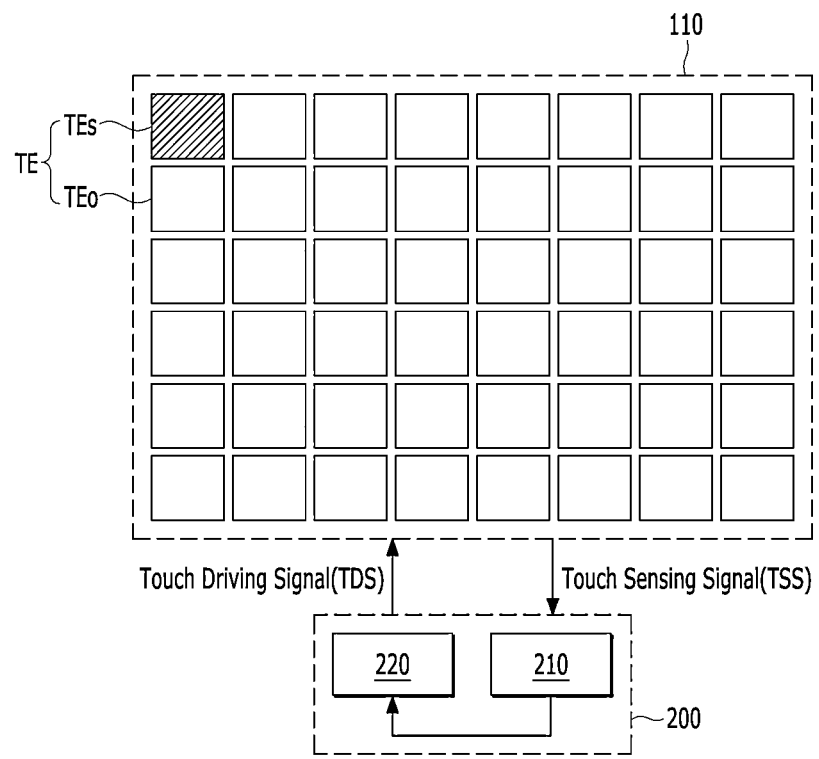
FIG. 2 is a diagram illustrating an example of a touch sensing operation in the touch sensing display apparatus according to one embodiment of the present disclosure.

FIG. 2 is a diagram illustrating an example of a touch sensing operation in the touch sensing display apparatus 100 according to one embodiment of the present disclosure.

Referring to FIG. 2, the touch sensing display apparatus 100 according to the present disclosure may include a plurality of touch electrodes TE which perform a function of a touch sensor and a touch circuit 200 which sequentially drives the plurality of touch electrodes TE to sense a touch input, so as to provide a touch sensing function.

The touch circuit 200 may sequentially perform driving and sensing of the plurality of touch electrodes TE in a touch sensing period where touch sensing is performed, and thus, may sense whether there is a touch input and touch coordinates of a position to which the touch input is applied.

The touch circuit 200 may select at least one of the plurality of touch electrodes TE as a touch electrode TEs which is to be sensed and may supply a touch block driving signal TDS to the selected touch electrode TEs. Subsequently, based on a touch sensing signal TSS received from an unselected touch electrode TEo and the selected touch electrode TEs, the touch circuit 200 may calculate the amount of variation of a capacitance (or the amount of variation of a voltage or the amount of variation of a charged voltage) of each touch electrode TE, may sense whether there is a touch input, and may calculate touch coordinates of a position to which the touch input is applied.

The touch circuit 200, for example, may include a touch sensing circuit 210 which supplies the touch block driving signal TDS to the display panel 110 and the touch sensing signal TSS from the touch electrode TEs at a position corresponding to the touch block driving signal TDS and a touch controller 220 which controls generating of a signal associated with touch sensing and performs a touch process of receiving the touch sensing signal TSS from the touch sensing circuit 210 to detect whether there is a touch and calculate touch coordinates.

Here, a touch sensing period where touch sensing is performed may be temporally separated from a display driving period where an image is displayed on the display panel 110 and may be performed at the same with the display driving period. In the touch sensing period, an alternating current (AC) signal having the same phase and amplitude as those of the touch block driving signal TDS may be supplied to a data line and a gate line of the display panel 110, and thus, load free driving for reducing an adverse effect of a parasitic capacitance of the touch electrode TE on a touch sensing result may be performed.

A size of the touch electrode TE disposed in the display panel 110 may correspond to an area size of one subpixel, or may correspond to an area size of two or more subpixels. Also, each touch electrode TE may be a plate type where there is no opening portion, or may be a mesh type including one or more opening portions. For example, in a case where one touch electrode TE is a mesh type and has a size corresponding to an area size of two or more subpixels, one touch electrode TE may include two or more opening portions, and a position and a size of each of the two or more opening portions may correspond to a position and a size of an emission region of a corresponding subpixel.

Figure 3:
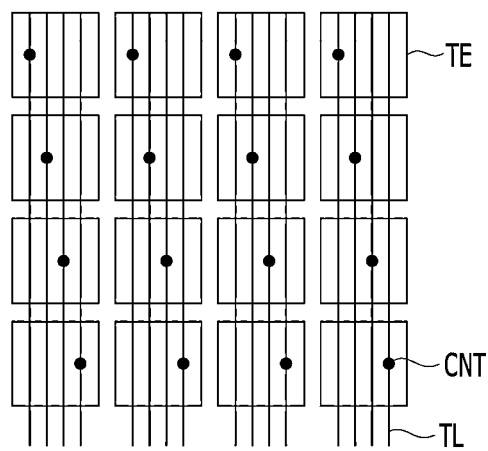
FIG. 3 is a diagram illustrating a touch electrode array of a split connection type capable of being included in a display panel, in a comparative example according to one embodiment of the present disclosure.

FIG. 3 is a diagram illustrating a touch electrode array of a split connection type capable of being included in a display panel 110, in a comparative example.

Referring to FIG. 3, in the touch electrode array TEA of the split connection type according to the comparative example, each touch electrode TE may be divisionally connected to one touch line TL through a contact hole CNT. A plurality of touch electrodes TE may be disposed in an active region. Depending on the case, some (for example, an outermost touch electrode) of the plurality of touch electrodes TE may be disposed in an outer region (or an external region) surrounding the active region, or may extend up to the outer region from the active region. Here, the active region may be a region which displays an image, or may be region capable of touch sensing.

All of a plurality of touch lines TL may be disposed from a point connected to the touch sensing circuit 210 up to an opposite point to have the same length or similar lengths. In each of the plurality of touch lines TL, only a position (i.e., a position of the contact hole CNT) electrically connected to a corresponding touch electrode TE may be changed.

As described above, in the touch electrode array TEA of the split connection type, because one touch electrode TE should be electrically connected to one touch line TL, the number of touch lines TL may need to be equal to the number of touch electrodes TE. Here, the number of touch lines TL may correspond to the number of sensing channels for a signal input/output of the touch sensing circuit 210. As in FIG. 3, in a case where the touch electrode array TEA of the split connection type is configured with 4*4 touch electrodes TE, sixteen touch lines TL respectively connected to sixteen touch electrode TE may be disposed in the touch electrode array TEA, and thus, sixteen touch channels may be needed.

In other words, in the touch electrode array TEA of the split connection type, as a size of the display panel 110 increases, the number of touch electrodes TE and the number of touch lines TL may increase for securing touch performance, and due to this, a manufacturing yield rate of display panels may be low or the manufacturing cost may increase.

Figure 4:
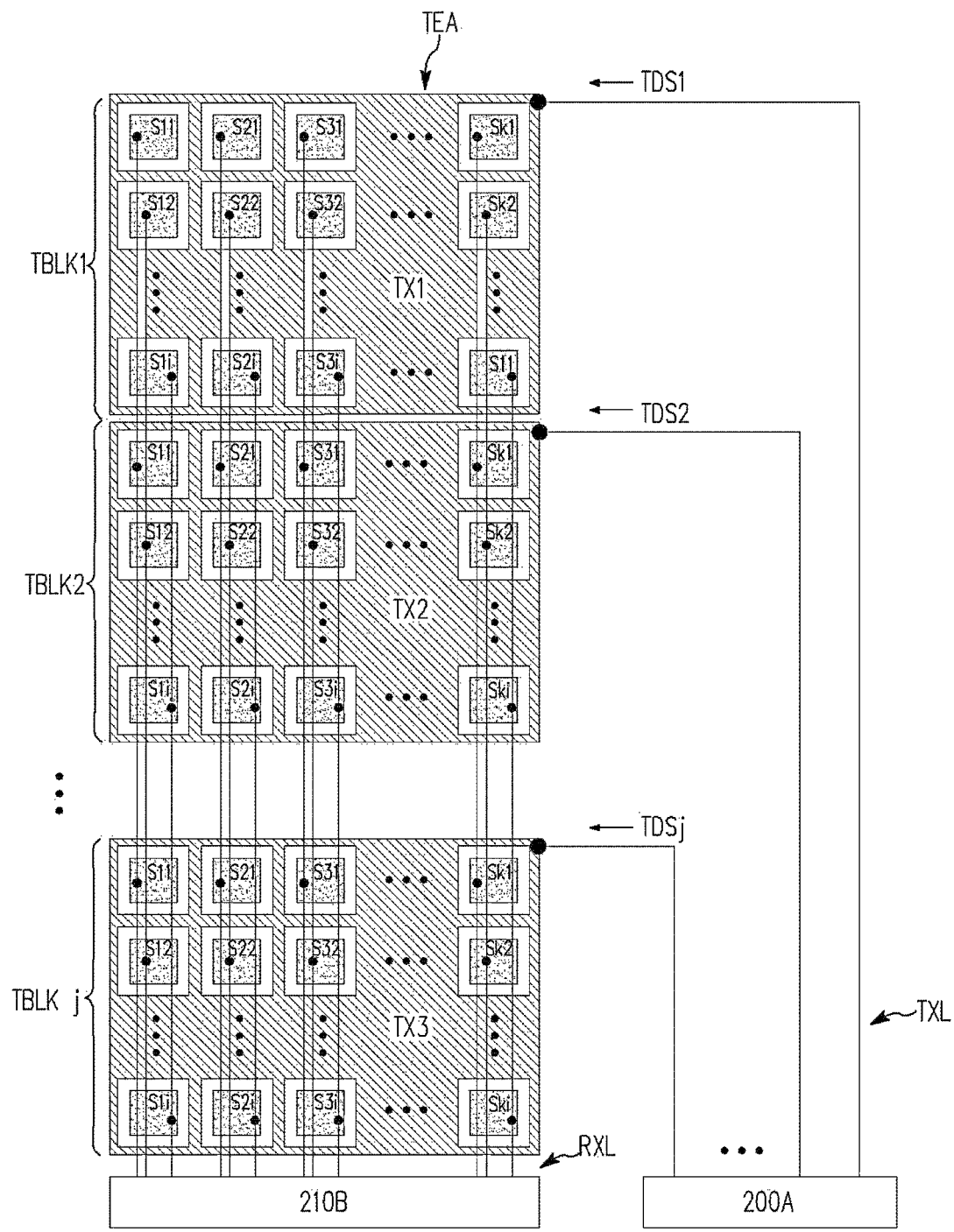
FIG. 4 is a diagram illustrating a touch electrode array of a multi-connection type capable of being included in a display panel, according to one embodiment of the present disclosure.
Figure 5:
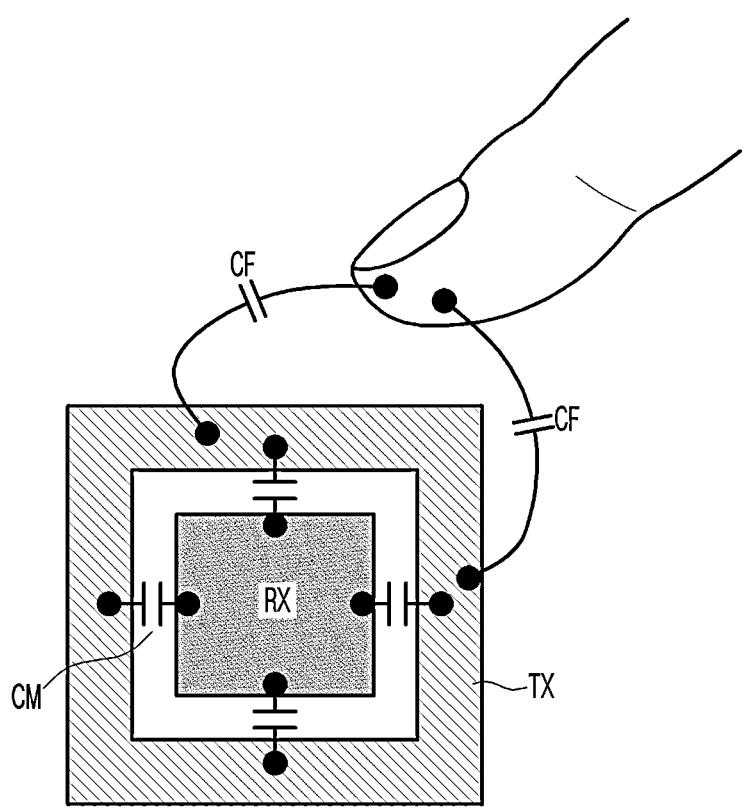
FIGS. 5 and 6 are diagrams illustrating an example where touch electrodes are divided into TX electrodes and RX electrodes, for mutual touch sensing according to one embodiment of the present disclosure.
Figure 6:
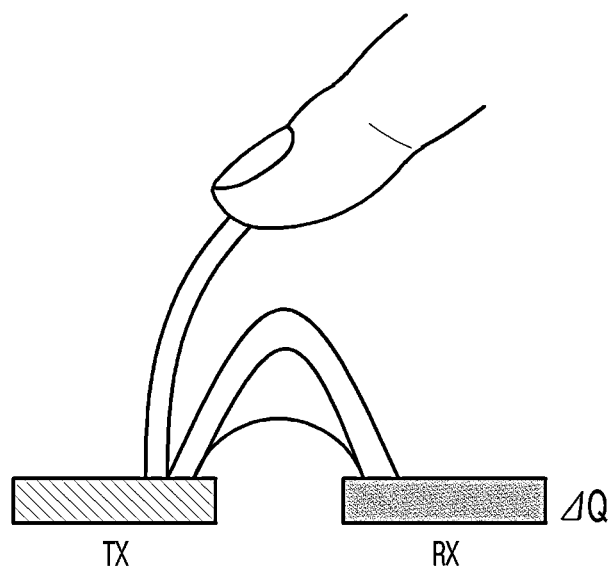

FIG. 4 is a diagram illustrating a touch electrode array TEA of a multi-connection type capable of being included in a display panel 110, according to one embodiment of the present disclosure. FIGS. 5 and 6 are diagrams illustrating an example where touch electrodes are divided into TX electrodes and RX electrodes, for mutual touch sensing according to one embodiment of the present disclosure.

Referring to FIGS. 4 to 6, a touch electrode array TEA of the multi-connection type according to the present disclosure may be divided into a plurality of touch blocks TBLK1 to TBLKj (where j may be a natural number of 2 or more), a touch electrode for touch sensing of a mutual capacitance type may be divided into TX electrodes and RX electrodes, and a touch line may be divided into a TX driving line TXL and an RX sensing line RXL. Each of the touch blocks may include one TX electrode pattern (one of TX1 to TXj) and k*i (where k and i may each be a natural number) number of RX electrodes S11 to Ski.

The TX electrode pattern may be implemented as an integration-type electrode or a mesh electrode pattern of a mesh type. Likewise, the RX electrode pattern may be implemented as an integration-type electrode or a mesh electrode pattern of a mesh type.

The TX electrode patterns TX1 to TXj of the plurality of touch blocks TBLK1 to TBLKj may be connected to a TX driving circuit 210A through TX driving lines TXL. RX electrodes corresponding to the same row and column positions of each touch block may be connected to an RX sensing circuit 210B through one RX sensing line RXL.

For example, RX electrodes S11 of 1*1 positions of the touch blocks TBLK1 to TBLKj may be connected to the RX sensing circuit 210B through one RX sensing line RXL, and RX electrodes Ski of k*i positions of the touch blocks TBLK1 to TBLKj may be connected to the RX sensing circuit 210B through one RX sensing line RXL.

The number of TX driving lines TXL may be the same as the number of touch blocks TBLK1 to TBLKj. The number of RX sensing lines RXL may be the same as the number of RX electrodes S11 to Ski.

The number of TX channels of the TX driving circuit 210A connected to the TX driving lines TXL may be the same as the number of touch blocks TBLK1 to TBLKj. The number of RX channels of the RX sensing circuit 210B connected to the RX sensing lines RXL may be the same as the number of RX electrodes S11 to Ski. Accordingly, such a multi-connection type may more effectively decrease the number of touch channels than the split connection type of FIG. 3.

In each touch block, the TX electrode pattern and the RX electrodes may be disposed on the same plane. The TX electrode pattern may surround each of the RX electrodes with a certain interval therebetween on the same plane. In other words, the TX electrode pattern may cover each of the RX electrodes with a certain interval therebetween on the same plane.

For example, a first TX electrode pattern TX1 and first RX electrodes S11 to Ski may be disposed on the same plane in a first touch block TBLK1, and a second TX electrode pattern TX2 and second RX electrodes S11 to Ski may be disposed on the same plane in a second touch block TBLK2. The first TX electrode pattern TX1 may be formed to surround each of the first RX electrodes S11 to Ski with a certain interval therebetween on the same plane, and the second TX electrode pattern TX2 may be formed to surround each of the second RX electrodes S11 to Ski with a certain interval therebetween on the same plane.

In the same plane, the TX electrode pattern and each of the RX electrodes may be coupled to each other through a mutual capacitance CM. For example, the first TX electrode pattern TX1 and each of the first RX electrodes S11 to Ski may be coupled to each other through a mutual capacitance CM in the first touch block TBLK1, and the second TX electrode pattern TX2 and each of the second RX electrodes S11 to Ski may be coupled to each other through a mutual capacitance CM in the second touch block TBLK2.

Furthermore, in each touch block, the TX electrode pattern may be disposed on a first plane, and the RX electrodes may be disposed on a second plane which differs from the first plane. In this case, one or more insulation layers may be disposed between the first plane and the second plane.

A mutual capacitance CM at a position to which a finger touch CF is applied may more decrease than a mutual capacitance CM at a position to which a finger touch is not applied. Due to such a capacitance difference, a difference ΔQ may occur between the amount of electric charge sensed from an RX electrode at a touch position and the amount of electric charge sensed from an RX electrode at a non-touch position. The RX sensing circuit 210B may accumulate ΔQ in synchronization with a touch block driving signal of a multi-pulse form, and thus, may obtain a touch sensing value for calculating touch coordinates and whether there is a touch or not.

Figure 7:
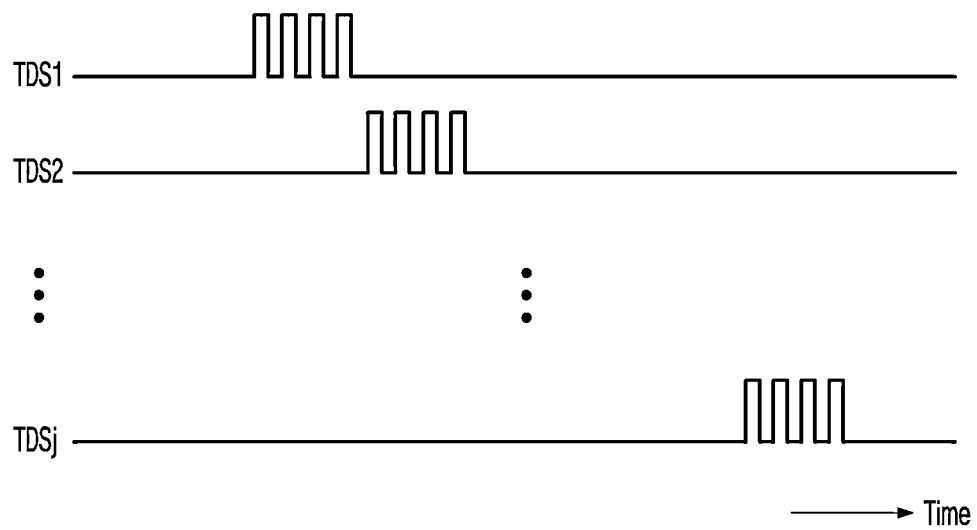
FIG. 7 is a diagram illustrating touch block driving signals for sequentially driving a touch electrode array of a multi-connection type by touch block units according to one embodiment of the present disclosure.

FIG. 7 is a diagram illustrating touch block driving signals for sequentially driving a touch electrode array of a multi-connection type by touch block units according to one embodiment of the present disclosure.

Referring to FIG. 7, a TX driving circuit 210A may time-divisionally drive TX driving lines TXL. The TX driving circuit 210A may supply a first touch block driving signal TDS1 of a multi-pulse form to a first TX driving line during a first period and may supply a second touch block driving signal TDS2 of a multi-pulse form to a second TX driving line during a second period succeeding the first period.

Touch blocks TBLK1 to TBLKj may be sequentially activated in response to touch block driving signals TDS1 to TDSj applied thereto through time division, and thus, an accurate touch input position may be sensed despite a multi-connection type where RX electrodes of the touch blocks TBLK1 to TBLKj are connected to one RX sensing line RXL in common.

As described above, the present disclosure may reduce the number of touch channels by using the multi-connection type and may sequentially sense the touch blocks TBLK1 to TBLKj by using a touch block driving signal based on time division, thereby preventing the occurrence of a ghost touch. According to the present disclosure, a problem may not occur where an actually untouched point is abnormally recognized as a touch position due to a ghost phenomenon despite a multi-touch input.

Figure 8:
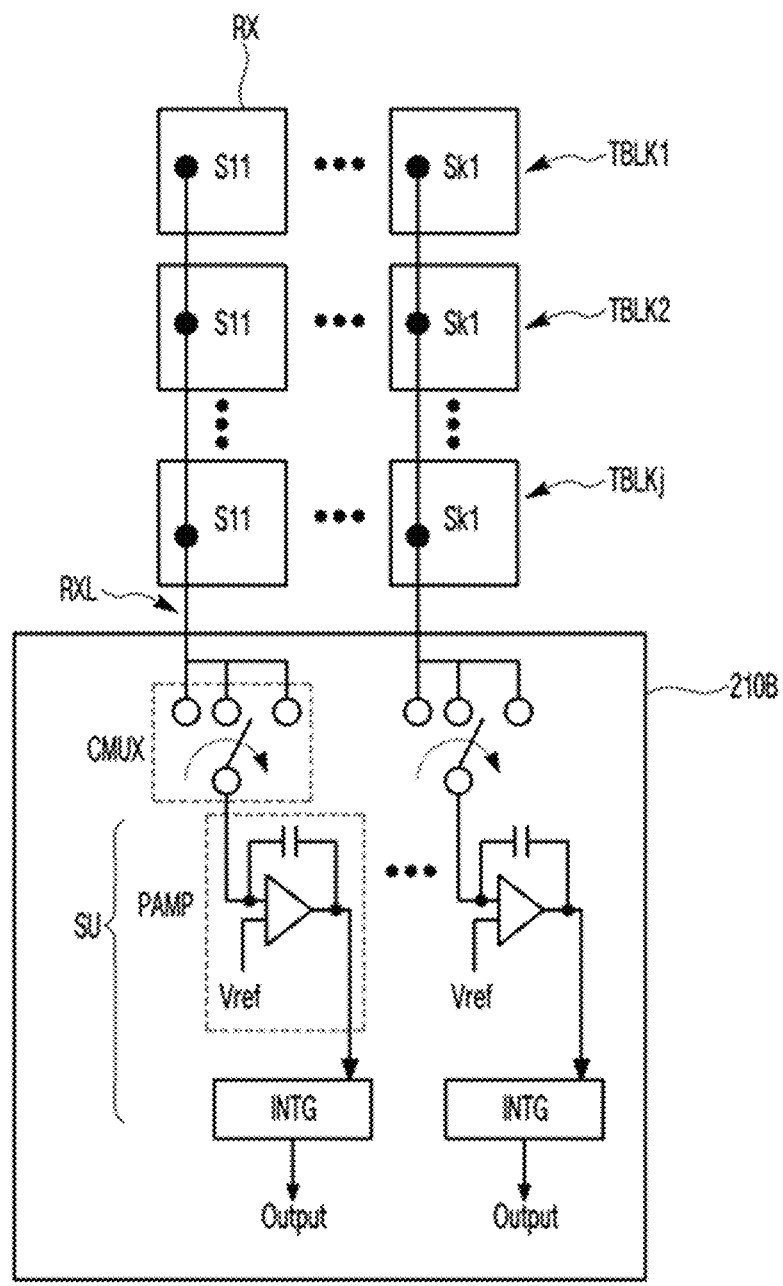
FIG. 8 is a diagram illustrating an example where RX electrodes are connected to an RX sensing circuit in a multi-connection type according to one embodiment of the present disclosure.

FIG. 8 is a diagram illustrating an example where RX electrodes are connected to an RX sensing circuit in a multi-connection type according to one embodiment of the present disclosure.

Referring to FIG. 8, an RX sensing circuit 210B may include a channel multiplexer circuit CMUX and a sensing circuit SU. The sensing circuit SU may include preamplifier circuits PAMP and integrators INTG.

The channel multiplexer circuit CMUX may selectively connect RX sensing lines RXL to an input terminal of the preamplifier circuit PAMP. The channel multiplexer circuit CMUX may have a selection ratio of 1:M (where M may be a natural number of 2 or more). The number of selection ratios of the channel multiplexer circuit CMUX may be the same as or different from the number of touch blocks.

The preamplifier circuit PAMP may receive electric charges charged in the RX electrodes through the RX sensing lines RXL and may amplify the electric charges.

The integrator INTG may be connected to an output terminal of the preamplifier circuit PAMP. The integrator INTG may perform an integral on the electric charges amplified by the preamplifier circuit PAMP and may accumulate integral-performed electric charges, in synchronization with a touch block driving signal of a multi-pulse form.

Figure 9:
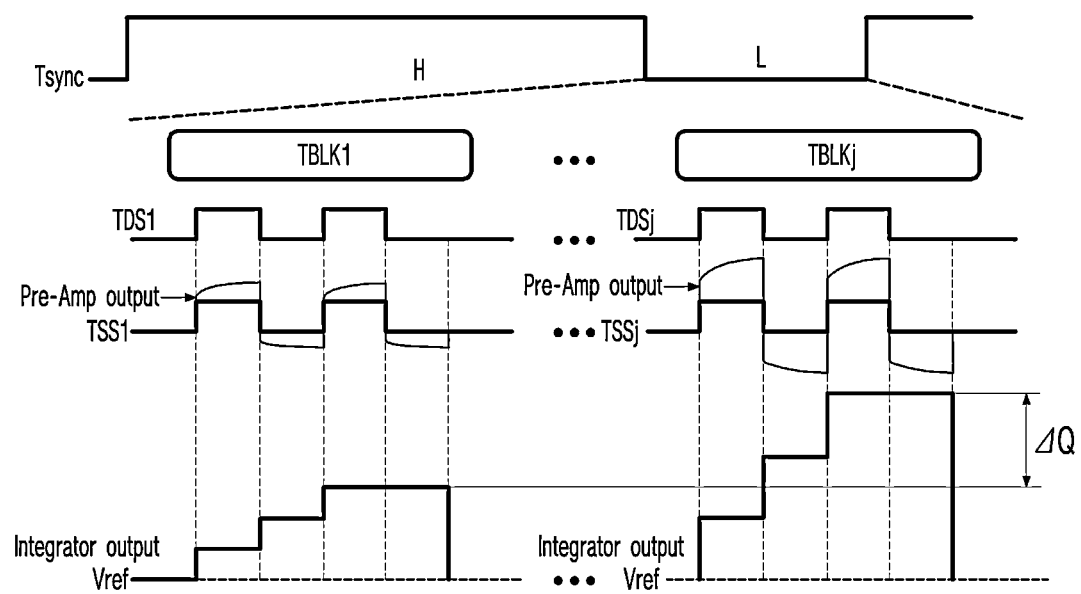
FIG. 9 is a diagram showing a touch block-based touch sensing result waveform based on a touch block driving signal according to one embodiment of the present disclosure.

FIG. 9 is a diagram showing a touch block-based touch sensing result waveform based on a touch block driving signal according to one embodiment of the present disclosure.

Referring to FIG. 9, a touch sensing operation may be performed in a low logic period L of a touch synchronization signal Tsync. A display operation may be performed in a high logic period H of the touch synchronization signal Tsync.

In one frame period, each of the high logic period H and the low logic period L of the touch synchronization signal Tsync may be allocated as one or in plurality.

When a touch input is applied to a first touch block TBLK1 and a touch input is not applied to a second touch block TBLK2, an integrator output value of the second touch block TBLK2 may be ΔQ higher than an integrator output value (or a touch sensing value) of the first touch block TBLK1.

The present disclosure may realize the following effects.

The present disclosure may connect touch electrodes to a touch sensing circuit in the multi-connection type to decrease the number of touch channels.

Moreover, the present disclosure may sequentially sense touch electrodes connected to one another in the multi-connection type to prevent or at least reduce the occurrence of a ghost touch.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A touch sensing display apparatus comprising:
   a first touch block including a plurality of first RX electrodes and a first TX electrode pattern that divides the plurality of first RX electrodes;
   a second touch block including a plurality of second RX electrodes and a second TX electrode pattern that divides the plurality of second RX electrodes;
   a TX driving circuit connected to the first TX electrode pattern through a first TX driving line and connected to the second TX electrode pattern through a second TX driving line; and
   a RX sensing circuit connected to the plurality of first RX electrodes and the plurality of second RX electrodes through a plurality of RX sensing lines,
   wherein each of the plurality of RX sensing lines is connected to one of the plurality of first RX electrodes and one of the plurality of second RX electrodes.

2. The touch sensing display apparatus of claim 1, wherein the first TX electrode pattern and the plurality of first RX electrodes are on a same plane, and the second TX electrode pattern and the plurality of second RX electrodes are on a same plane.

3. The touch sensing display apparatus of claim 1, wherein the first TX electrode pattern surrounds each of the plurality of first RX electrodes with a certain interval therebetween on a same plane, and the second TX electrode pattern surrounds each of the plurality of second RX electrodes with a certain interval therebetween on a same plane.

4. The touch sensing display apparatus of claim 1, wherein the first TX electrode pattern and each of the plurality of first RX electrodes are coupled to each other through a mutual capacitance, and the second TX electrode pattern and each of the plurality of second RX electrodes are coupled to each other through a mutual capacitance.

5. The touch sensing display apparatus of claim 1, wherein the plurality of first RX electrodes are provided as a k*i (where each of k and i is a natural number) number in the first touch block,
   the plurality of second RX electrodes are provided as a k*i (where each of k and i is a natural number) number in the second touch block, and
   a first RX electrode from the plurality of first RX electrodes and a second RX electrode from the plurality of second RX electrodes each corresponding to a same row and column positions are connected to a same RX sensing line from the plurality of RX sensing lines.

6. The touch sensing display apparatus of claim 5, wherein a number of RX sensing lines is a same as the number of the plurality of first RX electrodes or the number of the plurality of second RX electrodes.

7. The touch sensing display apparatus of claim 1, wherein the TX driving circuit time-divisionally drive the first TX driving line and the second TX driving line.

8. The touch sensing display apparatus of claim 7, wherein the TX driving circuit supplies a first touch block driving signal of a multi-pulse form to the first TX driving line during a first period and supplies a second touch block driving signal of a multi-pulse form to the second TX driving line during a second period succeeding the first period.

9. The touch sensing display apparatus of claim 8, wherein the RX sensing circuit senses, through the plurality of RX sensing lines, an amount of electric charges of the plurality of first RX electrodes varying in synchronization with the first touch block driving signal during the first period and senses, through the plurality of RX sensing lines, an amount of electric charges of the plurality of second RX electrodes varying in synchronization with the second touch block driving signal during the second period.

10. The touch sensing display apparatus of claim 9, wherein the RX sensing circuit comprises:
    a plurality of preamplifier circuits;
    a channel multiplexer circuit configured to selectively connect input terminals of the plurality of preamplifier circuits to the plurality of RX sensing lines; and
    a plurality of integrators connected to output terminals of the plurality of preamplifier circuits.

* * * * *